G. P. MORRILL.
Wedge for Ax and Tool Handles.
No. 224,029.          Patented Feb. 3, 1880.
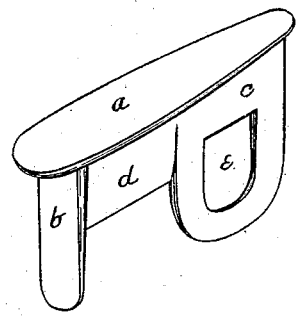
Witnesses
Chas. C. Lund
Daniel H. Ginty
Inventor
Geo. P. Morrill

UNITED STATES PATENT OFFICE.

GEORGE P. MORRILL, OF CANTERBURY, NEW HAMPSHIRE.

WEDGE FOR AX AND TOOL HANDLES.

SPECIFICATION forming part of Letters Patent No. 224,029, dated February 3, 1880.

Application filed October 15, 1879.

*To all whom it may concern:*

Be it known that I, GEORGE P. MORRILL, of Canterbury, in the county of Merrimack, State of New Hampshire, have invented certain Improvements in Wedges for Ax and Tool Handles, of which the following is a specification, reference being had to the accompanying drawing, which represents my invention in isometrical perspective.

In the figure, $a$ represents the top part of my wedge, made substantially in the shape of the eye of the ax, and which I make in different forms to correspond substantially with the shape of the eye of the tool with which it is to be used. From this top plate I project the transverse wedge $b$, and also the longitudinal wedge $c$, connected with each other by the wedge-shaped flange $d$. In the longitudinal wedge $c$, I leave an opening, (shown at $e$,) so that when the wedge is driven into the wood the fibers may expand and prevent the wedge from getting loose.

By the use of this device the handle is wedged in both directions at the same operation, and firmly held in place.

I claim as my invention—

The compound wedge for ax and tool handles, consisting of the top plate, $a$, provided with the transverse wedge $b$ and longitudinal wedge $c$, and the connecting-flange $d$ and opening $e$, combined as and for the purposes set forth.

Concord, New Hampshire, October 9, 1879.

GEO. P. MORRILL.

Witnesses:
 CHAS. C. LUND,
 DANIEL H. GIMTY.